United States Patent Office 3,573,268
Patented Mar. 30, 1971

3,573,268
METHOD FOR THE PREPARATION OF VINYL CHLORIDE BASED POLYMERS AT LOW TEMPERATURE
Marc E. Carrega, Chatenay-Malabry, France, assignor to Produits Chimiques Pechiney-Saint-Gobain, du Chateau, Neuilly-sur-Seine, France
No Drawing. Filed Mar. 24, 1969, Ser. No. 809,970
Claims priority, application France, Mar. 28, 1968, 145,879; Dec. 30, 1968, 181,937
Int. Cl. C08f 1/04, 1/56
U.S. Cl. 260—92.8                             21 Claims

ABSTRACT OF THE DISCLOSURE

The method for preparing vinyl chloride based polymers in which the monomers containing vinyl chloride are polymerized at low temperature in a catalytic system formulated of an (a) system containing a reducing compound of a metal in the sub-groups I–A to IV–A of the periodic classification; a compound of a transition metal selected from the sub-groups I–B to VII–B and VIII of the periodic classification, and a peroxygenated compound.

---

The present invention relates to a method for the preparation of polymers and copolymers by mass polymerization at low temperature of a vinyl chloride base material as well as to the products resulting therefrom.

It has previously been proposed to polymerize vinyl chloride in the presence of catalyst systems constituted by a reducing compound containing a metal selected from the sub-groups I–A to IV–A of the periodic classification (see Handbook of Chemistry and Physics, 45th edition, The Chemical Rubber Publishing Co., page B2) plus zinc, and constituted by a compound containing a transition metal. Such systems are constituted, for example, by mixtures of organo-alumino compounds with titanium and zirconium tetrahalides. The use of such catalyst systems has a tendency of cauing a dehydrochlorination of the polymer as it is formed. In order to prevent this dehydrochlorination, it has been proposed to add to said systems compounds which yield electrons, such as ethers. However, such complex systems are active only at ordinary temperatures. They make it possible to obtain polymers on the basis of vinyl chloride only with conventional properties so that they offer no advantages in relation to the usual peroxide systems.

The applicant has discovered that the addition of a peroxygenated compound to systems constituted of a reducing compound containing a metal selected from the group containing the metals of the sub-groups I–A to IV–A of the periodic classification plus zinc and a transition metal compound makes it possible markedly to reduce the reaction temperature of said systems, while avoiding the dehydrochlorination of the vinyl chloride so that the presence of complexing agents, such as the ether type, is not required.

The method of preparing polymers and copolymers based on vinyl chloride, which is the objective of the invention, consists in polymerizing or copolymerizing in mass a vinyl chloride monomer based system in the presence of a catalyst constituted by a system (a) containing:

a reducing compound of a metal selected from the sub-groups I–A to IV–A of the periodic classification plus zinc;
a compound of a transition metal of the sub-groups I–B to VII–B and VIII of the periodic classification; and
a peroxygenated compound (b), such as peroxides, hydroperoxides, peresters and peracids.

In a first embodiment of the method of this invention, the (a) systems are formed preferably of an organo-alumino compound having the formula

wherein $R_1$ represents a possibly ramified aliphatic radical which may contain up to 12 carbon atoms, $R_2$ represents a hydrogen or halide atom, such as fluorine, chlorine, bromine or iodine, or a possibly ramified aliphatic radical which may contain up to 12 carbon atoms, and $R_3$ represents a hydrogen or halide atom, such as fluorine, chlorine, bromine or iodine or a possibly ramified aliphatic radical which may contain up to 12 carbon atoms; a compound of titanium having the formula

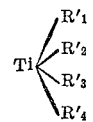

wherein $R'_1$, $R'_2$, $R'_3$, $R'_4$ are the same or different, and represent halide atoms such as chlorine, bromine, or iodine or $OR''$ radicals wherein $R''$ represents a ramified or non-ramified grouping, preferably a primary alkyl, aryl or aralkyl, which may contain up to 20 carbon atoms.

As the titanium compounds which preferably enter the composition of said (a) systems, reference can be made by way of illustration to titanium tetrachloride, n-propyl titanate, isopropyl titanate, tripropyl chlorotitanate, or dichlorodipropoxy-titanium.

The first embodiment of the method of the invention can be carried out at temperatures within the range of −100° C. to 0° C. (−148° to +32° F.) and preferably within the range of −85° C. to −20° C. (−121° to −4° F.) when the titanium compound contains at least one halide atom in its molecule; within the range of −100° C. and +30° C. (−148° and +86° F.) and preferably −85° C. and 0° C. when the titanium compound does not contain a halide atom in its molecule.

The (a) systems used in the first embodiment of the invention are prepared in a dry nitrogen atmosphere, at ordinary temperature or elevated temperature by bringing into contact the organo-alumino compound and a titanium base compound, with or without an inert solvent medium for both metal compounds, in a ratio of aluminum atoms of the organo-alumino compound to the titanium atoms of the titanium compound of at least 1, in case of non-halogenated organo-alumino compound systems-non-halogenated titanium compound and halogenated organo-alumino compound-halogenated or unhalogenated titanium compound and at least equal to 1:3 in case of the non-halogenated organo-alumino compound system-halogenated titanium compound. While both metal compounds are in contact, a reduction reaction is produced by the organo-alumino compound of a part or all of the IV titanium compounds. The titanium present in the resulting composition is meterable, after hydrolysis of said composition, in the form of $Ti^{+++}$ ions.

If such (a) systems are prepared in the presence of a solvent, they are obtained in a state of suspension. It has been discovered that the systems of halogenated organo-alumino compound-titanium compound are of higher densities than the systems of non-halogenated organo-alumino compound-titanium compound and can easily be separated by decantation, if necessary, from the solvent in which they have been prepared.

It has been found that at a given temperature the activity of the catalyst, used in the practice of this first embodiment, is a function of the amount of active oxygen, of the titanium$^{+++}$ compound obtained by reduction, and of the "free" organo-alumino compound it contains "Free" organo-alumino compound designates the quantity of organo-alumino compound not used to reduce the titanium$^{++++}$ compound. Thus, the hourly average yield from a vinyl chloride polymerization in a body at —40° C. in the presence of the triethyl aluminum/n-propyltitanate/monochloroacetyl peroxide couple is maximum when the atomic quantities of "free" aluminum of the "free" organo-alumino compound and of active oxygen are equal, and when the atomic ratio: active oxygen quantity to quantity of titanium$^{+++}$ of the trivalent titanium compound is 1.5.

For best practice of the first embodiment of the method, according to this invention, it is recommended to employ:

proportions of peroxygenated (b) compounds expressed in weight of active oxygen within the range of 0.0005 to 0.2 percent and preferably 0.001 to 0.1 percent in relation to the weight of the monomer compound;

proportions of organo-alumino compounds expressed in milliatom-grams of aluminum within the range of 0.001 to 50, and preferably 0.1 to 15 milliatom-grams of active oxygen, which corresponds to proportions of "free" organo-alumino compound proportions expressed in milliatom-grams of "free" aluminum in the order of 0 to 10 and preferably within the range of 0.5 to 4 per milliatom-grams of active oxygen;

proportions of titan III $^{(+++)}$ compounds expressed in milliatom-grams of titanium III within the range of $\frac{1}{10}$ to 10 and preferably 0.3 to 3 per milliatom-grams of active oxygen.

It has been discovered that for a better practice of the first embodiment of the method of the invention, it is advantageous to prepare the (a) system by bringing into contact with the titanium compound the minimum quantity of the organo-alumino compound necessary to reduce completely or quasi completely the titanium compound, then adding to the composition obtained the quantity of organo-alumino compound corresponding to the desired quantity of "free" organo-alumino compound, said addition being effected slightly prior to the carrying out of the polymerization. According to a preferential embodiment, the quantity of "free" organo-alumino compound may be introduced in the form of a non-halogenated organo-alumino compound.

According to a second embodiment of the method according to the invention, the (a) systems can be constituted favorably of:

an organo-alumino compound of the formula

wherein $R_1$ represents a possibly ramified aliphatic radical which may contain up to 12 carbon atoms, $R_2$ represents a hydrogen atom, a halide, such as fluorine, chlorine, bromine or iodine, or a possibly ramified aliphatic radical which may contain up to 12 carbon atoms, $R_3$ represents a hydrogen atom, a halide, such as fluorine, chlorine, bromine or iodine, and a possibly aliphatic ramified radical which may contain up to 12 carbon atoms;

a vanadium compound selected from the group including the trivalent and tetravalent vanadium acetylacetonates, the derivatives of the formula $VOX_{3-n}(OR)_n$, wherein X represents a chlorine or bromine atom, R represents a ramified or non-ramified group, alcoyl, aryl aralkyl, which may contain up to 20 carbon atoms, $n$ is an integer, equal to 0, 1, 2 or 3; the derivatives of the formula $VX'_4$, wherein X' represents a chlorine or fluorine atom; the derivatives of the formula $VOX''_2$ or $R'_2VX''_2$ wherein X" represents a chlorine or bromine atom and R' represents the cyclopentadienyl radical.

The applicant has discovered that this second embodiment makes it possible to obtain, under identical conditions of polymerization, products of molecular masses lower than those of the products obtained according to the first embodiment; the ability to work the products obtained in the presence of vanadium, particularly the spinning in collodion, will thus be easier than that of the products obtained in the presence of titanium.

Among the vanadium compounds preferably entering the composition of said (a) system there may be cited vanadium oxytrichloride, trivalent and tetravalent vanadium acetylacetonates.

The second embodiment of the method can be carried out at temperatures within the range of —100° C. and +30° C. (—158° and +86° F.), preferably —80° C. and 0° C. (—112° and +32° F.).

The (a) system used in the practice of the second embodiment of the method of the invention is prepared in a dry nitrogen atmosphere, at a temperature varying from —70° C. to +140° C. (—94° to +284° F.), depending on the vanadium compound used, by contacting the organo-alumino compound and the vanadium base compound, in the absence or presence of an inert solvent medium of both metal compounds, in a relation of the aluminum atoms of the organo-alumino compound to the vanadium atoms of the vanadium compound of 0.5 to 50, and preferably from 1.5 to 15. During such contact, a reduction of part or all of the vanadium compound takes place by the organo-alumino compound.

For a good execution of the second embodiment of the method according to the invention, it is advantageous to employ:

proportions of peroxygenated (b) compounds expressed in weight of active oxygen within the range of 0.0005 to 0.2 percent and preferably 0.001 to 0.1 percent, in relation to the weight of monomer composition;

proportions of the vanadium compound, expressed in milliatom-grams of vanadium, in the range of 0.001 to 10 and preferably 0.1 to 2 per milliatom-grams of active oxygen;

proportions of organo-alumino compounds expressed in milliatoms-grams of aluminum, within the range of 0.001 to 50 and preferably 0.1 to 10 per milliatom-grams of active oxygen.

Among the organo-alumino compounds which can be used in the practice of both embodiments of the method of the invention, there may be cited triethyl aluminum, triisobutyl aluminum, diethyl aluminum hydride, diisobutyl aluminum hydride, diethyl chloroaluminum, and diisobutyl chloroaluminum.

The inert solvent media which may be used to carry out both embodiments of the invention are preferably saturated hydrocarbons such as hexane, perfluorinated or chlorofluorinated compounds or mixtures of saturated hydrocarbons having boiling points up to 240° C. (464° F.).

For a good practice of both methods of embodiments, the quantity of inert solvent medium which may be present in the reaction zone of polymerization, should be low and preferably within the range of 0.5 to 5 percent by weight of the monomer compound employed.

Among the peroxygenated (b) compounds favorably employed in the practice of the invention, there may be cited such organic peracids as perbenzoic acid, peresters of mineral or organic acids, such as perborates, percarbonates, perbenzoates; hydroperoxides such as cumene hydroperoxide, diisopropylbenzene hydroperoxide, t-butyl hydroperoxide, ketone and aldehyde hydroperoxides; peroxides such as oxygenated water, cyclohexanon peroxide; and particularly diacyl peroxides, such as lauroyl peroxide, benzoyl peroxide, monochloroacetyl peroxide, alpha-chlorolauroyl peroxide, alpha-chlorocaproyl peroxide and alpha-alpha dichloropropionyl peroxide.

Among the monomers copolymerizable with vinyl chloride, in accordance with the practice of the present invention, there may be cited such olefins as ethylene, propylene, butenes, isobutene, hexene; vinyl esters, such as vinyl acrylates, fumarates, maleates and acetate; acrylonitrile, and ethylene fluor- or fluorochloro-substituted derivatives, such as vinyl fluoride, vinylidene fluoride, trifluorochloroethylene.

The different components of the catalyst component used in the method of the invention may be introduced into the polymerization reaction zone in any order; however, it has been discovered that better hourly outputs are obtained when the introduction of the peroxygenated (b) system precedes that of the (a) system.

The catalyst couple used in the method of this invention may be used to effect the different techniques of mass polymerization of monomer compounds on the basis of vinyl chloride and particularly the techniques described in French Pats. No. 1,079,772, filed July 29, 1952, No. 1,257,780, filed Feb. 26, 1960, No. 1,357,736, filed Feb. 26, 1962, No. 1,382,072, filed Mar. 1, 1963, No. 1,436,744 and No. 1,450,464, filed Mar. 17, 1965, No. 1,493,610 and No. 1,505,390, filed June 28, 1966.

Another object of this invention resides in the new industrial products of polymers and copolymers having a vinyl chloride base, obtained by mass polymerization in the presence of the above defined catalyst couple. By the invention, vinyl chloride base polymers and copolymers are obtained which have a high deformation temperature under load and a higher solvent resistance. These polymers and copolymers which can be placed in contact with boiling water or chlorinated solvents can be transformed into films, fibers or tubes by extrusion or calendering in an interesting manner.

The following examples are given by way of illustration, but not by way of limitation, of the practice of this invention:

EXAMPLES 1-3

A triethylaluminum/n-propyltitanate system having a ratio milliatoms-grams of aluminum of the triethylaluminum to milliatoms-grams of titanium of the titanate (Al/Ti) of 3 is prepared as follows in trichlorotrifluoro ethane corresponding to the formula $CF_2Cl-CFCl_2$, with a boiling point of about 48° C.:

8.52 grams of n-propyl titanate in 42.8 grams of trichlorotrifluoro ethane, which corresponds to 30 milliatoms-grams of titanium, are introduced into a flat bottom 200 ml. demijohn provided with a magnetic agitator, a cooling means and a thermometer, after purging with very pure nitrogen, containing at least 10 p.p.m. of oxygen by volume and at least 5 p.p.m. of water by volume; 10.26 grams of triethyl aluminum in 42.8 grams trichlorotrifluoroethane, which corresponds to 90 milliatom-grams of aluminum, are introduced dropwise into the titanate solution while maintaining the temperature at 50° C. (122° F.).

After 4 hours of both compounds in contact it will be noticed that in the suspension obtained the entire titanium is in the condition of titanium III.

600 grams of vinyl chloride are introduced into a one liter glass autoclave, purged with very pure nitrogen and provided with a double jacket and a magnetic anchor agitator. After degassing of 100 grams of vinyl chloride at +10° C. (50° F.), the autoclave is cooled to —40° C. (=—40° F.); then 7.5 milliatoms-grams of active oxygen in the form of 4.02 ml. of a solution of monochloroacetyl peroxide in dimethyl phthalate titrated at 2.96 grams of active oxygen per 100 ml. of solution, then a quantity of the suspension of the (a) system prepared above corresponding to 2.5 milliatoms-grams of titanium III are introduced. After 6 hours, 38 grams of resin are recovered, i.e. after 6 hours of polymerization. This corresponds to an average hourly output of 1.26%.

The operation of polymerization is repeated in the presence of increasing quantities of the suspension of the (a) system in relation to the quantity of active oxygen.

The results obtained are compiled in the following Table I:

TABLE I

| Examples | 1 | 2 | 3 |
|---|---|---|---|
| Ti in milliatoms-grams | 2.5 | 3.75 | 5 |
| Al in milliatoms-grams | 7.5 | 11.25 | 15 |
| Al/Ti | 3 | 3 | 3 |
| Ti III in milliatoms-grams | 2.5 | 3.75 | 5 |
| Free Al in milliatoms-grams | 5 | 7.5 | 10 |
| Oxygen*/Ti III | 3.0 | 2.0 | 1.5 |
| Trichloro-trifluoroethane in g | 7.14 | 10.7 | 14.28 |
| Output in h.⁻¹ in percent | 1.26 | 2.3 | 2.2 |
| Duration of polymerization in hours | 6 | 3.83 | 3.5 |
| Oxygen* in milliatoms-grams | 7.5 | 7.5 | 7.5 |

It is noted that for a ratio of Al/Ti=3, the average hourly output from a polymerization operation of vinyl chloride at —40° C. in the presence of monochloroacetyl peroxide and a triethylaluminum/n-propyltitanate system in trichlorotrifluoroethane is maximum when the atomic quantities of "free" aluminum and of active oxygen are equal.

The intrinsic viscosity of a sample of the resin obtained in Example 2, measured at 70° C. (158° F.) in cyclohexanon is 193 ml./gram.

EXAMPLES 4-7

A suspension of the (a) system with a ratio of Al/Ti=2 is prepared according to the method of Example 1 by putting in contact, at 50° C., 16 grams of n-propyl titanate in 53.9 grams of trichlorotrifluoroethane, which corresponds to 56.25 milliatoms-grams of titanium and 12.83 grams triethyl aluminum in 53.9 grams trichlorotrifluoroethane, corresponding to 112.5 millliatoms-grams aluminum. It is noted that after 10 hours of contact, 83% by weight of the titanium has been reduced to titanium (+++).

As in Example 1, 500 grams of vinyl chloride are polymerized at —40° C. in the presence of 7.5 milliatoms-grams of active oxygen, in the form of the monochloroacetyl peroxide solution, the titer of which is indicated in Example 1 and a quantity of the suspension of the (a) system prepared above, corresponding to 1.5 milliatoms-grams of titanium III.

After 6 hours of polymerization, 27 grams of resin are recovered which corresponds to an hourly output of 0.91%.

The operation of polymerization is repeated in the presence of increasing quantities of the suspension of the (a) system in relation to the quantity of active oxygen.

The results obtained are compiled in the following Table II:

TABLE II

| Examples | 4 | 5 | 6 | 7 |
|---|---|---|---|---|
| Ti in milliatoms-grams | 3.0125 | 4.5 | 6.025 | 12.05 |
| Al in milliatoms-grams | 6.025 | 9 | 12.05 | 24.1 |
| Al/Ti | 2 | 2 | 2 | 2 |
| Ti III in milliatoms-grams | 2.5 | 3.75 | 5 | 10 |
| Free Al in milliatoms-grams | 3.55 | 5.35 | 7.10 | 14.2 |
| O*/Ti in milliatoms-grams | 7.5 | 7.5 | 7.5 | 7.5 |
| O*/Ti III | 3 | 2 | 1.5 | 0.75 |
| Trichlorotrifluoroethane in grams | 10.8 | 16.2 | 21.6 | 43.2 |
| Output h.⁻¹ in percent | 0.91 | 1.33 | 2.40 | 2.22 |
| Duration of polymerization in hours | 6 | 6 | 6 | 6 |

It is noted that for a ratio of Al/Ti=2, the average hourly output from a polymerization operation of vinyl chloride at —40° C. in the presence of monochloroacetyl peroxide and the triethylaluminum/n-propyltitanate system in trichlorotrifluoroethane is maximum when the atomic quantities of free aluminum and of active oxygen are equal.

The intrinsic viscosity of a sample of the resin obtained in Example 6, measured at 70° C. in cyclohexanon, is 163 ml./gram.

EXAMPLES 8–12

A suspension of the (a) system with the ratio of Al/Ti=4 is prepared by the method of Example 1 by putting in contact, at 50° C., 8.52 grams of n-propyl titanate in 57.1 grams of trichlorotrifluoroethane, which corresponds to 30 milliatoms-grams of titanium and 13.68 grams of triethyl aluminum in 57.1 grams trichlorotrifluoroethane, corresponding to 120 milliatoms-grams of aluminum. It will be noted that, after 1 hour of contact, the entire amount of titanium has been reduced to titanium III (+++).

As in Example 1, 500 grams of vinyl chloride are polymerized at —40° C. in the presence of 7.5 milliatoms-grams of active oxygen, in the form of monochloroacetyl peroxide solution, the titer of which is indicated in Example 1 and a quantity of the suspension of (a) system prepared above, corresponding to 1.25 milliatoms-grams of titanium III.

After 6 hours of polymerization, 13 grams of resin are recovered, which corresponds to an hourly output of 0.43% on the average.

The operation of polymerization is repeated in the presence of increasing quantities of the suspension of the (a) system in relation to the quantity of active oxygen.

The results obtained are compiled in the following Table III:

TALE III

| Examples | 8 | 9 | 10 | 11 | 12 |
|---|---|---|---|---|---|
| Ti in milliatoms-grams | 1.25 | 2.50 | 3.75 | 5 | 7.5 |
| Al in milliatoms-grams | 5 | 10 | 15 | 20 | 30 |
| Al/Ti | 4 | 4 | 4 | 4 | 4 |
| Ti III in milliatoms-grams | 1.25 | 2.50 | 3.75 | 5 | 7.5 |
| Free Al in milliatoms-grams | 3.75 | 7.50 | 11.25 | 15 | 22.50 |
| O* in milliatoms-grams | 7.5 | 7.5 | 7.5 | 7.5 | 7.5 |
| O*/Ti III | 6 | 3 | 2 | 1.5 | 1 |
| Trichlorotrifluoroethane in grams | 4.76 | 9.52 | 14.28 | 19.04 | 28.56 |
| Hourly output in percent | 0.43 | 0.67 | 0.99 | 1.07 | 0.63 |
| Duration of polymerization in hours | 6 | 6 | 6 | 6 | 6 |

It is noted that for a ratio of Al/Ti=4, the hourly average output from the polymerization operation is no longer maximum when the atomic quantities of free aluminum and of active oxygen are equal. It is also noted that, for a given amount of active oxygen, the average hourly output is less affected by the variations of the quantity of free aluminum when the Al/Ti ratio is 4 than when this ratio is 2 or 3.

The intrinsic viscosity of a sample of the resin obtained in Example 11, measured at 70° C. in cyclohexanon, is 78 ml./gram.

EXAMPLE 13

In a fraction of petroleum having a boiling point ranging from 140° to 230° C. (284° to 446° F.) deflavored with oleum, a fraction which will be called fraction "A," a triethylaluminum/n-propyl titanate system is prepared with an Al/Ti ratio of 3 by putting in contact, at 60° C., 11.9 grams n-propyl titanate in 26 grams of fraction "A," which corresponds to 42 milliatoms-grams of titanium and 14.36 grams of triethyl aluminum in 26 grams of fraction "A," which corresponds to 126 milliatoms-grams of aluminum. It is noted that after 2.5 hours of contact, 85% of the titanium has been reduced to titanium III. As in Example 1, 500 grams vinyl chloride are polymerized at —40° C. in the presence of 7.5 milliatoms-grams active oxygen, in the form of monochloroacetyl peroxide solution, the titer of which is indicated in Example 1, and a quantity of the suspension of the (a) system prepared above, corresponding to 3.75 milliatoms-grams of titanium +++.

After 6 hours of polymerization, 29 grams of resin are recovered, which corresponds to an average hourly output of 0.97%.

EXAMPLE 14

A suspension of the (a) system with the ratio of Al/Ti=1 is prepared by the method of Example 1 by putting in contact, at 140° C., 17.75 grams n-propyl titanate in 39.8 grams of fraction "A," which corresponds to 62.5 milliatoms-grams of titanium, and 7.125 grams triethyl aluminum in 39.8 grams of fraction "A," which corresponds to 62.5 milliatoms-grams of aluminum. It is noted that after 3 hours of contact, 86% of the titanium has been reduced to titanium III.

As in Example 1, 500 grams vinyl chloride are polymerized at —40° C. in the presence of 7.5 milliatoms-grams of active oxygen, in the form of the monochloroacetyl peroxide solution, the titer of which is indicated in Example 1, a quantity of the suspension of the (a) system prepared above, corresponding to 3.75 milliatoms-grams of titanium III and 8.75 milliatom-grams of additional aluminum in the form of triethyl aluminum.

After 6 hours of polymerization, 55 grams of resin are recovered which corresponds to an average hourly output of 1.83%.

The results obtained in Examples 13 and 14 are compiled in the following Table IV:

TABLE IV

| Examples | 13 | 14 |
|---|---|---|
| Al in milliatoms-grams in (a) | 13.05 | 4.30 |
| Ti in milliatoms-grams | 4.35 | 4.35 |
| Al added in milliatoms-grams | 0 | 8.75 |
| Free Al in milliatoms-grams | 9.30 | 9.30 |
| Total Al in milliatoms-grams | 13.05 | 13.05 |
| Al/Ti | 3 | 3 |
| Ti III in milliatoms-grams | 3.75 | 3.75 |
| O* in milliatoms-grams | 7.5 | 7.5 |
| O*/Ti III | 2 | 2 |
| Fraction "A" in grams | 5.40 | 5.54 |
| Hourly output in percent | 0.97 | 1.85 |
| Duration of polymerization in hours | 6 | 6 |

These two examples show clearly that it is preferable to prepare the suspensions of system (a) without excessive organo-aluminum compound and to add the desired excess of organo-aluminum compound only when the titanium has been reduced to titanium III.

EXAMPLES 15–18

A suspension in the "A" fraction of the triethyl-aluminum/n-propyl titanate system is prepared as in Example 14 with an Al/Ti ratio=1. It is noted that the total amount of titanate can be reduced if the reaction of the two components is carried out at 140° C. for 4 hours.

As in Example 1, 500 grams vinyl chloride are polymerized at —40° C. in the presence of 7.5 milliatoms-grams of active oxygen in the form of monochloroacetyl peroxide solution, the titer of which is indicated in Example 1, and of decreasing quantities of the suspension of the prepared (a) system and 7.5 milliatoms-grams of aluminum in the form of triethyl aluminum.

The results obtained are compiled in the following Table V:

TABLE V

| Examples | 15 | 16 | 17 | 18 |
|---|---|---|---|---|
| Al in milliatoms-grams in (a) | 15 | 7.5 | 5 | 3.75 |
| Ti in milliatoms-grams | 15 | 7.5 | 5 | 3.75 |
| Added Al in milliatoms-grams | 7.50 | 7.50 | 7.50 | 7.50 |
| Free Al in milliatoms-grams | 7.50 | 7.50 | 7.50 | 7.50 |
| Total Al in milliatoms-grams | 22.5 | 15 | 12.5 | 11.25 |
| Al/Ti | 1.5 | 2 | 2.5 | 3 |
| Ti III in milliatoms-grams | 15 | 7.5 | 5 | 3.75 |
| O* in milliatoms-grams | 7.50 | 7.50 | 7.50 | 7.50 |
| O*/Ti III | 0.50 | 1 | 1.50 | 2.00 |
| Fraction "A" in grams | 19.1 | 9.55 | 6.36 | 4.77 |
| Hourly output in percent | 1.96 | 2.20 | 2.24 | 1.72 |
| Duration of polymerization in hours | 6 | 6 | 6 | 6 |

It is noted that the hourly average yield is maximum when the ratio of active oxygen/Ti III is equal to 1.5 and when the atomic quantities of free aluminum and of active oxygen are equal.

The intrinsic viscosity of a sample of a resin obtained in Example 17, measured in cyclohexanon at 70° C., is 200 ml./gram.

EXAMPLES 19 AND 20

A suspension of an (a) system is prepared as in Example 1, by putting in contact, at 140° C. (284° F.), 17.75 grams of isopropyl titanate in 39.8 grams of fraction "A," which corresponds to 62.5 milliatoms-grams of titanium, and 7.125 grams of triethyl aluminum in 39.8 grams of fraction "A," which corresponds to 62.5 milliatoms-grams of aluminum. After 4 hours of contact, 37.5% of the titanium will have been reduced to titanium III.

As in Example 1, 500 grams of vinyl chloride are polymerized at −40° C. by introducing into the reaction zone 7.5 milliatoms-grams of active oxygen in the form of monochloroacetyl peroxide solution, the titer of which is as in Example 1, then a quantity of the suspension of the (a) system, corresponding to 13.33 milliatoms-grams of total titanium.

After 6 hours of polymerization, 40 grams of resin are recovered, corresponding to an average hourly output of 1.34%.

The polymerization is repeated by reversing the order of introduction of the two ingredients of the catalytic couple, that is by introducing into the reaction area, the suspension of the (a) system prior to the peroxide.

After 6 hours of polymerization, 33 grams of resin are recovered which corresponds to an average hourly output of 1.09%.

These examples clearly show the significance of the order of introduction of the different ingredients of the catalytic couple.

EXAMPLES 21 AND 22

The purpose of these examples is to show that the quantity of inert solvent used for preparation of the suspension of the (a) system should be low.

A suspension of an (a) system is prepared as in Example 1, by putting in contact, at 50° C., for 2¼ hours, 28.4 grams of isopropyl titanate in 23.4 grams of trichlorotrifluoroethane, which corresponds to 100 milliatoms-grams titanium, and 34.2 grams triethyl aluminum in 23.4 grams trichlorotrifluoroethane, which corresponds to 300 milliatoms-grams aluminum. 92.8% of the titanium is converted into titanium III.

As in Example 1, 500 grams of vinyl chloride are polymerized at −40° C. in the presence of 7.5 milliatoms-grams of active oxygen, in the form of monochloroacetyl peroxide solution, the titer of which is indicated in Example 1, a quantity of the suspension of the prepared (a) system corresponding to 4 milliatom-grams of total titanium, and 7.75 grams additional trichlorotrifluoroethane.

After 6 hours of polymerization, 54.6 grams of resin are recovered, which corresponds to an average hourly output of 1.82%.

The obtained resin has an intrinsic viscosity, measured at 70° C. in cyclohexanon, equal to 216 ml./gram.

The operation is carried out as above but without the addition of the additional 7.75 grams of trichlorotrifluoroethane.

After 6 hours of polymerization, 67 grams of resin are recovered which corresponds to an average hourly yield of 2.24%.

The obtained resin has an intrinsic viscosity, measured at 70° C. in cyclohexanon, equal to 190 ml./gram.

EXAMPLE 23

This example illustrates the polymerization at −40° C. of vinyl chloride in the presence of the catalytic couple: monochloroacetyl peroxide/Ti O—$C_3H_7$)Cl-triethyl aluminum.

A solution of tripropyl chlorotitanate is prepared by heating at 60° C. for 30 minutes, 32.6 grams of fraction "A," 9.4 millimoles $TiCl_4$ and 28.2 millimoles n-propyl titanate.

A suspension of an (a) system with a ratio of Al/Ti=1 is prepared in the "A" fraction by putting in contact, at 60° C. (140° F.), the above prepared chlorotitanate solution corresponding to 37.5 milliatoms-grams of titanium and 4.275 grams of triethyl aluminum in 16.3 grams of fraction "A," corresponding to 37.5 milliatoms-grams aluminum. It is noted that, after 6 hours of contact, 95% of the titanium has been reduced to titanium III.

As in Example 1, 500 grams of vinyl chloride are polymerized at −40° C. in the presence of 7.5 milliatoms-grams of active oxygen, in the form of monochloroacetyl peroxide solution, the titer of which is indicated in Example 1, and a quantity of the suspension of the prepared (a) system corresponding to 5.25 milliatom-grams of titanium that is 5 milliatom-grams of titanium III and 7.5 milliatoms-grams of additional aluminum in the form of triethyl aluminum.

After 4 hours of polymerization, 90 grams of resin are recovered, corresponding to an average hourly output of 4.5%.

EXAMPLES 24–27

In a fraction of saturated petroleum having a boiling point between 65° and 110° C. (149° and 230° F.), which we shall call fraction "B," an (a) system of an Al/Ti ratio=1 is prepared by putting in contact at 60° C., 14.2 grams n-propyl titanate in 27.8 grams of fraction "B" corresponding to 50 milliatoms titanium, and 5.6 grams triethyl aluminum in 27.8 grams of fraction "B" corresponding to 50 milliatoms-grams aluminum. It is noted that, after 10 hours of contact, 67% of the titanium is reduced to titanium III.

As in Example 1, successive polymerizations are carried out at −40° C., of 500 grams vinyl chloride in the presence of a quantity of the suspension of the prepared (a) system, corresponding to 5.03 milliatoms-grams titanium III and 7.5 milliatoms-grams active oxygen in the form of:

4.02 ml. of a monochloroacetyl peroxide solution in dimethyl phthalate containing 2.96 grams per 100 ml. of solution;

14.7 ml. of an alpha chlorolauroyl peroxide solution in hexane, containing 0.818 gram per 100 ml. of solution;

13.9 ml. of an alpha chlorocaproyl peroxide solution in hexane, containing 0.860 gram per 100 ml. of solution;

15.5 ml. of an alpha-alpha dichloropropionyl peroxide solution in hexane, containing 0.776 gram per 100 ml. of solution.

The results are compiled in the following Table VI:

TABLE VI

| Examples | 24 | 25 | 26 | 27 |
|---|---|---|---|---|
| Peroxide | (1) | (2) | (3) | (4) |
| Ti in milliatoms-grams | 7.5 | 7.5 | 7.5 | 7.5 |
| Al in milliatoms-grams | 7.5 | 7.5 | 7.5 | 7.5 |
| Al/Ti | 1 | 1 | 1 | 1 |
| Ti III in milliatoms-grams | 5.03 | 5.03 | 5.03 | 5.03 |
| Free Al in milliatoms-grams | 2.47 | 2.47 | 2.47 | 2.47 |
| O* in milliatoms-grams | 7.5 | 7.5 | 7.5 | 7.5 |
| O*/Ti III | 1.49 | 1.49 | 1.49 | 1.49 |
| Fraction "B" plus hexane in grams | 8.35 | 14.45 | 16.45 | 17.60 |
| Duration of polymerization in hours | 6 | 6 | 6 | 6 |
| Hourly yield in percent | 1.6 | 1.40 | 1.75 | 0.84 |
| Intrinsic vicosity ($\eta$) 70° C | 268 | 217 | 265 | 245 |

[1] Mono chloroacetyl.
[2] Alpha chlorolauroyl.
[3] Alpha chlorocaproyl.
[4] Alpha-alpha dichloropropionyl.

EXAMPLES 28 and 29

The operation described in Example 24 is carried out in the presence of the same catalytic couple, at a temperature of −30° C. (−22° F.) instead of −40° C. After 6 hours of polymerization, 86 grams of resin are recovered which corresponds to an average hourly yield of 2.8%.

In an analogous operation carried out at −20° C. (−4° F.), 86 grams of resin are obtained in 4 hours, which corresponds to an hourly yield of 4.3%.

EXAMPLE 30

This example illustrates the polymerization at −80° C. (−112° F.) of vinyl chloride in the presence of the catalytic couple: monochloroacetyl peroxide/TiCl$_4$+triethyl aluminum.

A suspension in fraction "B" of an (a) system is prepared by putting in contact at 30° C. (+86° F.) 0.96 gram titanium tetrachloride in 3.2 grams of fraction "B," corresponding to 5 mliliatoms-grams of titanium, and 0.57 gram of triethyl aluminum in 3.2 grams of fraction "B," corresponding to 5 milliatoms-grams of aluminum. After 2 hours of contact, 100% of the tetrachloride has been reduced.

500 grams vinyl chloride are polymerized at −80° C. in the 1 liter autoclave described in Example 1, in the presence of 7.5 milliatoms-grams active oxygen, in the form of 4.02 ml. of a solution of monochloroacetyl peroxide in dimethyl phthalate, titrated at 2.96 grams of active oxygen per 100 ml. of solution, and the suspension of the prepared (a) system.

After 5 hours of polymerization, 4.1 grams of resin are recovered, corresponding to an average yield of 0.164%.

EXAMPLES 31 AND 32

The operation of polymerization carried out in the preceding example is repeated by adding to the catalytic couple, an additional quantity of triethyl aluminum, equivalent to 7.5 milliatoms-grams of aluminum. After 5 hours of polymerization, 8.8 grams of resin are recovered, corresponding to an average hourly yield equal to 0.352%.

In an identical polymerization carried out at −40° C. instead of −80° C., 100 grams of polymer are obtained in 3 hours, corresponding to an average hourly yield of 6.66%. A measurement of the Vicat softening temperature of a sample of this resin shows that the Vicat point is 96° C.

EXAMPLE 33

A suspension of an (a) system is prepared in 38 grams of fraction "A" by reduction of 8.53 grams n-propyl titanate with 3.42 grams of triethyl aluminum. The reduction reaction is carried out for 1 hour at 120° C. (248° F).

1900 grams vinyl chloride are introduced at 0° C. (32° F.) into a stainless steel 3 liter autoclave provided with an anchor shaped agitator rotating at 100 r.p.m., and purged with pure nitrogen; after degassing of 200 grams vinylchloride, the autoclave is cooled to −15° C. (+5° F.); then the following components are introduced successively under nitrogen:

15.4 ml. of a monochloroacetyl peroxide solution in dimethyl phthalate, titrating 3.2 grams active oxygen per 100 ml.;
the suspension of the prepared (a) system; and
300 grams propylene The autoclave is heated and maintained at 0° C. for 6 hours. Then the autoclave is degasified and the agitation is subsequently stopped. The contents are poured into methanol, for stopping the reaction and eliminating the dimethyl phthalate and the possible low molecular weight components. After drying, 140 grams copolymer are recovered corresponding to an average hourly yield of 1.17%.

The centesimal analysis and the infrared spectrum show that the obtained copolymer contains in its chain 88.5% vinyl chloride and 11.5% propylene.

EXAMPLE 34

A diisobutyl aluminum hydride-n-propyl titanate system with an Al/Ti ratio=1 is prepared in the demijohn used in Example 1, by introducing into said demijohn a molar solution of diisobutyl aluminum hydride in fraction "A," then dropwise, at 15° C., a molar solution of n-propyl titanate; the composition obtained is heated under nitrogen and with agitation at 140° C. for 3 hours and 20 minutes; the solution is allowed to cool to 20° C.; after 15 hours, it is noted that 98% of the titanium has been reduced to titanium III. As in Example 1, 500 grams of vinyl chloride are polymerized at −40° C. in the presence of 7.5 milliatoms-grams of active oxygen in the form of the monochloroacetyl peroxide solution, the titer of which is indicated in Example 1, in the presence of a quantity of the prepared system (a) suspension corresponding to 5 milliatoms-grams titanium III and of 7.5 milliatoms-grams of additional free aluminum, in the form of diisobutyl aluminum hydride.

After 6 hours of polymerization at −40° C., 60 grams of resin are recovered, corresponding to an hourly yield of 2%.

EXAMPLE 35

The operation of polymerization carried out in the preceding example is repeated, but the 7.5 milliatoms-grams of additional free aluminum are introduced in the form of triethyl aluminum instead of diisobutyl aluminum hydride.

After 5 hours of polymerization at −40° C., 70 grams of resins are recovered, which corresponds to an average hourly yield of 2.8%.

EXAMPLE 36

A triethyl aluminum-n-propyl titanate system is prepared in the demijohn used in Example 1, by introducing 30 ml. of a molar solution of triethyl aluminum into fraction "A," then dropwise, at 15° C., 30 ml. of a molar solution of propyl titanate in fraction "A." The composition obtained is heated under nitrogen and agitation at 140° C. for 3 hours and 20 minutes. It was noted that 60.8% of the titanium was reduced to titanium III.

500 grams vinyl chloride are polymerized at −15° C. in the presence of one milliatom-gram of active oxygen in the form of t-butyl hydroperoxide at 5% di-t-butyl peroxide, in the presence of a quantity of the suspension of the (a) system prepared above, corresponding to 0.33 milliatom-gram titanium III, and an additional amount of aluminum in the form of triethyl aluminum in order to obtain a quantity of "free" aluminum of 4 milliatoms-grams. After 3 hours and 40 minutes polymerization, 6 grams of resin are recovered, corresponding to an average hourly output of 0.34%.

EXAMPLE 37

The operation of the preceding example is repeated in the presence of 1 milliatom-gram of active oxygen in the form of an isopropyl peroxydicarbonate solution in diethyl maleate titrated at 2.36 grams active oxygen per 100 ml. of solution, instead of t-butyl hydroperoxide.

After 3 hours and 30 minutes of polymerization, 17 grams of resin are recovered, corresponding to an average hourly output of 0.97%.

EXAMPLE 38

In a 200 ml. flat bottom demijohn, provided with a magnetic agitator, a coolant and a thermometer, there is prepared in a petroleum fraction having a boiling point ranging between 140° and 230° C., and dearomatized with oleum, hereinafter referred to as fraction "A," a diethylchloroaluminum/n-propyl titanate system, whose ratio milliatom-grams of aluminum of the diethylchloroaluminum to milliatoms-grams of titanium of n-propyl titanate, Al/Ti=1.33. This (a) system is prepared by introducing into the demijohn, after purging with pure nitrogen containing less than 5 p.p.m. by volume of water and less than 10 p.p.m. by volume of oxygen, a molar solution of diethylchloroaluminum in fraction "A," then by introducing rapidly dropwise at 15° C., a molar solution of n-propyl titanate in fraction "A."

The composition obtained is heated under nitrogen and with agitation at 140° C. After 3 hours and 20 minutes of contact, it is noted that 98% of the titanium has been converted to titanium III.

In a 1 liter double-jacketed autoclave and an anchor agitator, 600 grams dry vinyl chloride containing less than 0.01% of water are introduced.

The autoclave is purged by degassing 100 grams vinyl chloride, then cooled under nitrogen to −40° C. 7.5 milli-atoms-grams of active oxygen are introduced in the form of 4.02 ml. of a monochloroacetyl peroxide solution in dimethyl phthalate titrating 2.96 grams of active oxygen per 100 ml. of solution, then a quantity of the suspension of the prepared system (a) corresponding to 5 milli-atoms-grams of titanium III, to which 7.5 milliatoms-grams of additional free aluminum were added in the form of triethyl aluminum.

After 5 hours of polymerization, 55 grams of resin are recovered corresponding to an hourly average yield of 2.2%.

EXAMPLE 39

A diethylchloro aluminum-dichlorodipropoxy titanium system with an Al/Ti ratio=1 is prepared as follows: di-chloro-dipropoxy titanium is obtained by reaction of an equimolecular mixture of $TiCl_4$ and n-propyl titanate.

A molar solution of diethylchloro aluminum in fraction "B," then rapidly dropwise at 0° C., a molar solution of dichloropropoxy titanium in fraction "A" are introduced into the demijohn used in Example 1; the suspension is allowed to cool to 20° C.

After 15 hours of contact at 20° C., it is noted that 98% of the titanium has been reduced to titanium III.

As in Example 1, 500 grams vinyl chloride are polymerized at −40° C. in the presence of 7.5 milliatoms-grams of active oxygen, in the form of the monochloro-acetyl peroxide solution, the titer of which is indicated in Example 1, and of a quantity of the prepared (a) system corresponding to 5 milliatoms-grams of titanium III, to which 7.5 additional milliatoms-grams of aluminum are added in the form of triethyl aluminum. After 4 hours of polymerization, 20 grams of polymer are recovered, corresponding to an average hourly yield of 1%.

EXAMPLE 40

A triethyl aluminum/vanadium oxychloride system containing 50 millimoles triethyl aluminum and 25 millimoles $VOCl_3$ is prepared in the following manner in a petroleum fraction having a boiling point between 140° and 230° C., dearomatized with oleum, which fraction we shall call fraction "A":

5.70 grams triethyl aluminum in solution in 18 grams of fraction "A" are introduced into a 200 ml. flat bottom demijohn provided with a magnetic agitator, cooling means, and a thermometer after purging in pure nitrogen containing less than 10 p.p.m. by volume of oxygen and less than 5 p.p.m. by volume of water; a solution of 4.33 grams $VOCl_3$ in 18 grams of fraction "A" is then dispatched in 5 minutes under agitation into the triethyl aluminum solution. The contacting is carried out under agitation for 30 minutes at 15° C. (=77° F.), then for one hour at ambient temperature.

600 grams vinyl chloride are placed into a 1 liter glass double-jacketed autoclave purged with nitrogen and a magnetic anchor agitator; after degassing of 100 grams vinylchloride at +10° C., the autoclave is cooled to −40° C. and then 7.5 milliatoms-grams of active oxygen are introduced in the form of 4.02 ml. of a solution of monochloroacetyl peroxide in dimethyl phthalate, titrated at 2.96 grams of active oxygen per 100 ml. of solution, followed by a quantity of the suspension of the prepared (a) system, corresponding to 5 milliatoms-grams vanadium to which suspension 7.5 milliatoms-grams of aluminum have been added shortly before the loading into the autoclave in the form of pure triethyl aluminum.

After 5 hours of polymerization at −40° C., 78 grams of polymer are recovered, corresponding to an average hourly yield of 3.12%; the intrinsic viscosity of the polymer in cyclohexanon at 70° C. (158° F.) is 108 ml./gram.

EXAMPLE 41

The preceding operation of polymerization is repeated in the presence of an additional quantity of triethyl aluminum, corresponding to 15 milliatoms-grams of aluminum instead of 7.5 milliatoms-grams.

After 5 hours of polymerization at −40° C., 50 grams of polymer are recovered, corresponding to an average hourly yield of 2%. The intrinsic viscosity of the polymer in cyclohexanon at 70° C. is 111 ml./gram.

EXAMPLE 42

As in Example 40, a triethyl aluminum-$VOCl_3$ system containing 25 millimoles triethyl aluminum and 25 millimoles $VOCl_3$ is prepared in fraction "A." 500 grams vinyl chloride are polymerized at −40° C., as in Example 40, in the presence of 7.5 milliatoms-grams active oxygen in the form of monochloroacetyl peroxide, the titer of which is indicated in Example 40, and in the presence of a quantity of the suspension of the prepared (a) system corresponding to 5 milliatoms-grams vanadium, to which 12.5 additional milliatoms-grams aluminum were added shortly prior to the loading into the autoclave in the form of triethyl aluminum.

After polymerization for 4 hours and 40 minutes at −40° C., 63 grams of resin are recovered, corresponding to an average hourly yield of 2.95%. The intrinsic viscosity of the polymer in cyclohexanon at 70° C. is 110 ml./gram.

EXAMPLE 43

As in Example 42, a triethyl aluminum-$VOCl_3$ system with a molar ratio of Al/V=1 is prepared in fraction "A."

In a stainless steel autoclave with a capacity of 10 liters, provided with an anchor agitator and a thermo-electric probe for measuring the internal temperature, the air pressure is reduced to 5 mm. mercury, and pure nitrogen is introduced up to an absolute pressure of 1.5 bars; the pressure is returned to 5 mm. mercury and 3.3 kilograms vinyl chloride are introduced at 10° C. 0.3 kilogram vinyl chloride is degasified, then after the temperature is brought down to −40° C., 45 milliatoms-grams active oxygen are introduced in the form of monochloroacetyl peroxide solution, the titer of which is indicated in Example 40, and a quantity of the suspension of the prepared (a) system corresponding to 27 milliatoms-grams vanadium, to which 71.4 milliatoms-grams aluminum have been added shortly prior to the loading of the autoclave, in the form of triethyl aluminum. After 12 hours of polymerization at −40° C., 840 grams of polymer are recovered, corresponding to an average hourly yield of 2.34%. The intrinsic viscosity of the polymer in cyclohexanon at 70° C. is 145 ml./gram. The apparent volumic mass of the polymer is 0.21 gram/ml

EXAMPLE 44

In the demijohn used in Example 40, a triethyl alumi-num-n-propyl titanate system with an Al/Ti ratio=1 is prepared by introducing into said demijohn a molar triethyl aluminum solution in fraction "A," then dropwise rapidly at 15° C., an n-propyl titanate molar solution is introduced. The compound obtained is heated under nitrogen and agitation at 140° for 3 hours and 20 minutes.

Into the autoclave of Example 43, 3 kilograms vinyl chloride are introduced. The autoclave is chilled to −40° C., then 3 grams t-butyl iodide, 60 grams of active oxygen in the form of the monochloroacetyl peroxide solution, the titer of which is indicated in Example 40, and a quantity of the suspension of the prepared (a) system corresponding to 45 milliatoms-grams titanium, to which 60 milliatoms-grams of aluminum have been added shortly prior to the loading of the autoclave, are introdduced into said autoclave, said 60 milliatoms-grams being introduced in the form of triethyl aluminum.

After 11 hours and 25 minutes of polymerization at −40° C., 927 grams of resin are recovered, corresponding to an average hourly yield of 2.71%. The intrinsic viscosity of the polymer in cyclohexanon at 70° C. is 145 ml./gram. The apparent volumic mass of the polymer is 0.18 gram/ml.

This example clearly shows that in order to obtain a resin of a molecular mass close to that of the resin prepared in Example 43, it is necessary to use larger quantities of t-butyl peroxide and iodide as chain limiting means.

EXAMPLE 45

As in Example 43, a triethyl aluminum-VOCl$_3$ system with a molecular ratio of Al/V=1 is prepared.

As in Example 40, 500 grams vinyl chloride are polymerized at −40° C. in the presence of 7.5 milliatoms-grams active oxygen in the form of monochloroacetyl peroxide solution, the titer of which is indicated in Example 40, and a quantity of the suspension of (a) system corresponding to 5 milliatoms-grams of vanadium, to which 7.5 milliatoms-grams of aluminum were added shortly prior to the introduction, in the form of triethyl aluminum.

After 4 hours and 20 minutes of polymerization at −40° C., 69 grams of resin are recovered corresponding to an average hourly yield of 2.95%. The intrinsic viscosity of the polymer in cyclohexanon at 70° C. is 110 ml./gram. The volumic apparent mass of the polymer is 0.17 gram/ml.

EXAMPLE 46

As in Example 44, a trimethyl aluminum-n-propyl titanate system with an Al/Ti ratio=1 is prepared.

As in Example 45, 500 grams of vinyl chloride are polymerized at −40° C. in the presence of 5 milliatoms-grams titanium instead of 5 milliatoms-grams of vanadium, the 7.5 milliatoms-grams of additional aluminum always being added in the form of triethyl aluminum.

After 4 hours and 20 minutes of polymerization at −40° C., 59.6 grams of resin are recovered, corresponding to an average hourly yield of 2.75%. The intrinsic viscosity of the polymer in cyclohexanon at 70° C. is 215 ml./gram. The apparent volumic mass of the polymer is 0.10 gram/ml.

EXAMPLE 47

The one liter autoclave described in Example 40 is filled with pure dry nitrogen; a quantity of VOCl$_3$ corresponding to 5 milliatoms-grams of vanadium is introduced into said autoclave in 5 ml. of fraction "A." The autoclave is cooled to −40° C., then a quantity of diethyl monochloro aluminum corresponding to 17.5 milliatoms-grams aluminum is introduced.

After 10 minutes of contact, 500 grams liquid vinyl chloride are gently introduced, then 7.5 milliatoms of active oxygen are added in the form of the monochloroacetyl peroxide solution, the titer of which is indicated in Example 40.

After 4 hours of polymerization, 84.8 grams of resin are recovered, which corresponds to an average hourly yield of 1.06%.

EXAMPLE 48

The one liter autoclave described in Example 40 is loaded with dry, pure nitrogen, then a quantity of vanadium acetylacetonate powder (vanadium III) of the formula V(CHCO$_3$CHCOCH$_3$)$_3$ corresponding to 5 milliatoms-grams of vanadium is introduced followed by 10 ml. of fraction "A." The temperature is lowered to −40° C., then a quantity of diethyl monochloroaluminum corresponding to 30 milliatoms-grams aluminum is introduced.

After ¾ hour of contact, 500 grams of liquid vinyl chloride are added, followed by 7.5 milliatoms-grams active oxygen in the form of the monochloroacetyl peroxide solution, the titer of which is indicated in Example 40.

After 5 hours and 15 minutes of polymerization at −40° C., 47.25 grams of resin are recovered which corresponds to an average hourly yield of 1.80%.

EXAMPLE 49

The preceding example is repeated, except that the ingredients of system (a) are introduced into the one liter autoclave, then the temperature of the autoclave is caused to rise from −40° C. to +10° C. during 10 minutes.

After 10 minutes of contacting, the temperature is lowered to −40° C., whereupon, as in the preceding example, vinyl chloride and active oxygen are introduced.

After a polymerization of 5 hours and 15 minutes, 32.8 grams resin are recovered which corresponds to an average hourly yield of 1.25%.

EXAMPLE 50

As in the method of operation of Example 48, the ingredients of the (a) system are placed in contact at −40° C. during minutes in the one liter autoclave, then the 500 grams vinyl chloride are introduced gently. The temperature is carried to −30° C., whereupon the 7.5 milliatoms-grams active oxygen are introduced.

After a polymerization of 2 hours and 45 minutes at −30° C., 78 grams of resin are recovered, corresponding to an average hourly yield of 5.66%. The intrinsic viscosity of the polymer in cyclohexanon is 91 ml./gram. The apparent volumic mass of the polymer is 0.16 gram/ml.

EXAMPLE 51

The polymerization described in Example 50 is repeated in the presence of 20 milliatoms-grams aluminum in lieu of 30 milliatoms-grams aluminum.

After a polymerization of 3 hours at −30° C., 98 grams of resin are recovered, corresponding to an hourly average yield of 6.54%. The intrinsic viscosity of the polymer in cyclohexanon at 70° C. in 89 ml./gram. The apparent volumic mass of the polymer is 0.21 gram/ml.

EXAMPLE 52

The operation of polymerization described in Example 50 is carried out in the presence of 15 milliatoms-grams aluminum in lieu of 30 milliatoms-grams aluminum.

After a polymerization of 2 hours and 25 minutes at −30° C., 80 grams of resin are recovered, corresponding to an average hourly yield of 6.65%. The apparent volumic mass of the polymer is 0.16 gram/ml.

EXAMPLE 53

The (a) system used in Example 48 is prepared in the one liter autoclave at −40° C. in the presence of 60 grams vinyl chloride in lieu of 10 ml. of fraction "A."

440 grams vinyl chloride are introduced gently, followed by adjusting the temperature to −30° C. and the introduction of 7.5 milliatoms-grams of active oxygen in the form of the monochloroacetyl peroxide solution, the titer of which is indicated in Example 40.

After a polymerization of 4 hours at −30° C., 95 grams of resin are recovered, corresponding to an average hourly yield of 4.75%. The apparent volumic mass of the polymer is 0.14 gram/ml.

EXAMPLE 54

The operation of polymerization described in Example 52 is repeated, the contacting of the vanadium compound and the organo-aluminum compound having been effected for 40 minutes at −40° C. in the presence of 10 ml. trichlorotrifluoroethane in lieu of 10 ml. of fraction "A."

After a polymerization of 2 hours and 40 minutes, 100 grams of resin are recovered, corresponding to an average hourly yield of 7.5%. The apparent volumic mass of the polymer is 0.21 gram/ml. The intrinsic viscosity of the polymer in cyclohexanon at 70° C. is 73 ml./gram.

As used herein, titanium IV is meant to refer to tetravalent titanium and titanium III is meant to refer to the trivalent form. The term "alumino," as used herein, is used interchangeably with "aluminum."

It will be understood that various changes may be made in the details of formulation and operation without departing from the spirit of the invention, especially as defined in the following claims.

I claim:

1. A method for preparing a vinyl chloride based polymer or copolymer characterized by polymerizing by mass polymerization a vinyl chloride based monomeric system in the presence of a catalytic couple formed of an (a) system containing an organo-aluminum compound having the formula

in which $R_1$ represents a possibly ramified aliphatic radical containing up to 12 carbon atoms, $R_2$ and $R_3$ represent an atom selected from the group consisting of hydrogen, a halogen and a possibly ramified aliphatic radical containing up to 12 carbon atoms, and a titanium compound having the formula

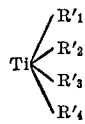

in which $R'_1$, $R'_2$, $R'_3$ and $R'_4$ are the same or different and represent a group selected from the group consisting of a halogen atom and an OR″ group wherein R″ represents a possibly ramified radical selected from the group consisting of alkyl, aryl and aralkyl radicals containing up to 20 carbon atoms; and a (b) peroxygenated compound selected from the group consisting of a peroxide, hydroperoxide, perester and peracid.

2. The method as claimed in claim 1 in which the halogen atom is selected from the group consisting of fluorine, chlorine, bromine and iodine.

3. The method as claimed in claim 1 in which the titanium compound is selected from the group consisting of titanium tetrachloride, n-propyl titanate, isopropyl titanate, tripropyl chlorotitanate, dichlorodipropoxy titanium.

4. The method as claimed in claim 1 in which the polymerization reaction is carried out at a temperature within the range of —100° C. to 0° C. when the titanium compound contains at least one halogen atom and from —100° C. to +30° C. when the titanium compound contains no halogen atom.

5. The method as claimed in claim 1 in which the polymerization reaction is carried out at a temperature within the range of —85° C. to —20° C. when the titanium compound contains at least one halogen atom and from —85° C. to 0° C. when the titanium compound contains no halogen atom.

6. The method as claimed in claim 1 in which the catalytic materials are present in the following proportions: peroxygenated (b) compound, expressed in weight of active oxygen, within the range of 0.0005 to 0.2 percent in relation to the weight of the monomer compound; organo aluminum compound, expressed in milliatoms-grams of aluminum, within the range of 0.001 to 50 per milliatom-grams of active oxygen; proportions of titanium, expressed in milliatom-grams of titanium reduced to titanium III, within the range of 0.1 to 10 per milliatom-grams of active oxygen.

7. The method as claimed in claim 1 in which the catalytic materials are present in the following proportions: peroxygenated (b) compound, expressed in weight of active oxygen, within the range of 0.001 to 0.1 percent in relation to the weight of the monomer compound; organo aluminum compound, expressed in milliatoms-grams of aluminum, within the range of 0.1 to 15 per milliatom-grams of active oxygen; proportions of titanium, expressed in milliatom-grams of titanium reduced to titanium III, within the range of 0.3 to 3 per milliatom-grams of active oxygen.

8. A method for preparing a vinyl chloride based polymer or copolymer characterized by polymerizing by mass polymerization a vinyl chloride based monomeric system in the presence of a catalytic couple formed of an (a) system containing an organo aluminum compound having the formula

in which $R_1$ represents a possibly ramified aliphatic radical containing up to 12 carbon atoms, $R_2$ and $R_3$ represent an atom selected from the group consisting of a hydrogen atom, a halogen and a possibly ramified aliphatic radical containing up to 12 carbon atoms; a vanadium compound selected from the group consisting of a trivalent and tetravalent vanadium acetyl-acetonate, the derivatives of the formula $VOX_{3-n}(OR)_n$ wherein X is selected from the group consisting of chlorine and bromine, R represents a possibly ramified radical selected from the group consisting of alkyl, aryl and aralkyl radicals containing up to 20 carbon atoms; $n$ is a number equal to 0, 1, 2 or 3; the derivatives of the formula $VX'_4$ wherein X' is a halogen selected from the group consisting of chlorine and fluorine; the derivatives of the formula $VOX''_2$ and $R'_2VX''_2$ in which X″ is a halogen selected from the group consisting of chlorine and bromine and R' is a cyclopentadienyl radical; a (b) peroxygenated compound selected from the group consisting of peroxides, hydroperoxides, peresters and peracids.

9. The method as claimed in claim 8 in which the vanadium compound is selected from the group consisting of trivalent and tetravalent vanadium acetylacetonate and vanadium oxytrichloride.

10. The method as claimed in claim 8 in which the polymerization is carried out at a temperature within the range of —100° C. to +30° C.

11. The method as claimed in claim 8 in which the polymerization is carried out at a temperature within the range of —80° C. to 0° C.

12. The method as claimed in claim 8 in which the catalytic system is employed in the proportions: (b) peroxygenated compound, expressed in weight of active oxygen, within the range of 0.0005 to 0.2 percent in relation to the weight of the monomer composition; of the vanadium compound expressed in milliatom-grams of vanadium within the range of 0.001 to 10 per milliatom-grams of active oxygen; and organo aluminum compound expressed in milliatom-grams of aluminum within the range of 0.001 to 50 per milliatom-grams of active oxygen.

13. The method as claimed in claim 8 in which the catalytic system is employed in the proportions: (b) peroxygenated compound, expressed in weight of active oxygen, within the range of 0.001 to 0.1 percent in relation to the weight of the monomer composition; of the vanadium compound expressed in milliatom-grams of vanadium within the range of 0.1 to 2 per milliatom-grams of active oxygen; and organo aluminum compound expressed in milliatom-grams of aluminum within the range of 0.1 to 10 per milliatom-grams of active oxygen.

14. The method as claimed in claim 1 in which the organo aluminum compound is selected from the group consisting of triethyl aluminum, triisobutyl aluminum, diethyl aluminum hydride, diisobutyl aluminum hydride, diethyl chloroaluminum, diisobutyl chloroaluminum.

15. The method as claimed in claim 8 in which the organo aluminum compound is selected from the group consisting of triethyl aluminum, triisobutyl aluminum, diethyl aluminum hydride, diisobutyl aluminum hydride, diethyl chloroaluminum, diisobutyl chloroaluminum.

16. The method as claimed in claim 1 in which the peroxygenated (b) compound is selected from the group consisting of perbenzoic acid, perborates, percarbonates, perbenzoates, cumene hydroperoxide, diisopropylbenzene hydroperoxide, t-butyl hydroperoxide, oxygenated water, cyclohexanon peroxide, lauroyl peroxide, benzoyl peroxide, monochloroacetyl peroxide, alpha-chlorolauroyl peroxide, alpha chlorocaproyl peroxide, alpha-alpha dichloropropionyl peroxide.

17. The method as claimed in claim 8 in which the peroxygenated (b) compound is selected from the group consisting of perbenzoic acid, perborates, percarbonates, perbenzoates, cumene hydroperoxide, diisopropylbenzene hydroperoxide, t-butyl hydroperoxide, oxygenated water, cyclohexanon peroxide, alpha-alpha dichloropropionyl peroxide.

18. The method as claimed in claim 1 in which the comonomers copolymerizable with vinyl chloride are selected from the group consisting of ethylene, propylene, butenes, isobutene, hexene, vinyl acrylates, fumarates, maleates and acetate, acrylonitrile, vinyl fluoride, vinylidene fluoride, trifluoroethylene.

19. The method as claimed in claim 8 in which the comonomers copolymerizable with vinyl chloride are selected from the group consisting of ethylene, propylene, butenes, isobutene, hexene, vinyl acrylates, fumarates, maleates and acetate, acrylonitrile, vinyl fluoride, vinylidene fluoride, trifluoroethylene.

20. The polymers and copolymers of vinyl chloride produced by the method of claim 1.

21. The polymers and copolymers of vinyl chloride produced by the method of claim 8.

References Cited
UNITED STATES PATENTS

| | | | |
|---|---|---|---|
| 3,300,463 | 1/1967 | De la Mare | 260—94.3 |

FOREIGN PATENTS

| | | | |
|---|---|---|---|
| 665,804 | 6/1963 | Canada | 260—92.8 |
| 937,275 | | Great Britain | 260—92.8 |

JOSEPH L. SCHOFER, Primary Examiner

J. A. DONAHUE, JR., Assistant Examiner

U.S. Cl. X.R.

260—85.5, 86.1, 87.1, 87.5, 87.7

UNITED STATES PATENT OFFICE

CERTIFICATE OF CORRECTION

Patent No. 3,573,268                      Dated March 30, 19

Marc E. Carrega

It is certified that errors appear in the above identified patent and that said Letters Patent are hereby corrected as shown below:

Column 5, line 23, "1962" should read "1963"

Column 6, line 47, "1.5" should read "2.5".

Column 16, line 24, before "minutes" the numeral "40 should be inserted.

Signed and sealed this 3rd day of August 1971.

(SEAL)
Attest:

EDWARD M. FLETCHER, JR.            WILLIAM E. SCHUYLER,
Attesting Officer                        Commissioner of Paten

UNITED STATES PATENT OFFICE
CERTIFICATE OF CORRECTION

Patent No. 3,573,268　　　　　　　　　　Dated　　March 30, 1971

Inventor(s)　　Marc E. Carrega

It is certified that error appears in the above-identified patent and that said Letters Patent are hereby corrected as shown below:

In the heading to the printed specification, after line 10, insert -- PV No. 69.00279, Jan. 10, 1969 --.

Signed and sealed this 7th day of December 1971.

(SEAL)
Attest:

EDWARD M. FLETCHER, JR.　　　　　　ROBERT GOTTSCHALK
Attesting Officer　　　　　　　　　　Acting Commissioner of Patents